US012722800B1

(12) United States Patent
Woods

(10) Patent No.: US 12,722,800 B1
(45) Date of Patent: Sep. 1, 2026

(54) AIRCRAFT SYSTEM FOR A MOBILE REFUELING VEHICLE

(71) Applicant: Ebony Doris Woods, Inglewood, CA (US)

(72) Inventor: Ebony Doris Woods, Inglewood, CA (US)

( * ) Notice: Subject to any disclaimer, the term of this patent is extended or adjusted under 35 U.S.C. 154(b) by 0 days.

(21) Appl. No.: 19/368,729

(22) Filed: Oct. 24, 2025

Related U.S. Application Data

(60) Provisional application No. 63/717,158, filed on Nov. 6, 2024.

(51) Int. Cl.
*B64F 1/28* (2006.01)
*B67D 7/40* (2010.01)
*B67D 7/84* (2010.01)
*B67D 7/16* (2010.01)

(52) U.S. Cl.
CPC .................. *B64F 1/28* (2013.01); *B67D 7/40* (2013.01); *B67D 7/845* (2013.01); *B67D 7/16* (2013.01)

(58) Field of Classification Search
CPC .... B64F 1/28; B67D 7/16; B67D 7/40; B67D 7/845
See application file for complete search history.

(56) References Cited

U.S. PATENT DOCUMENTS 2,362,559 A 11/1944 Jauch et al.
2,577,682 A 12/1951 Hinds et al.
2,600,876 A 6/1952 Jauch et al.
2,960,106 A 11/1960 Dyer et al.
3,648,720 A 3/1972 Kornahrens
4,844,133 A 7/1989 von Meyerinck et al.
5,305,805 A 4/1994 Watkins, Jr.
5,609,027 A 3/1997 Dunlevy
5,775,101 A 7/1998 Dunlevy
(Continued)

FOREIGN PATENT DOCUMENTS

CN 1121977251 A 6/2021

OTHER PUBLICATIONS

Hydrant Carts & Servicers, Cart or Chassis-Mounted, westmor-ind.com. https://westmor-ind.com/aviation/hydrant-carts-and-servicers/ [Date accessed: Sep. 4, 2024].
(Continued)

*Primary Examiner* — Jason K Niesz
(74) *Attorney, Agent, or Firm* — Bold IP PLLC; Houda El-Jarrah

(57) ABSTRACT

A mobile refueling cart system configured for efficient, safe, and adaptable refueling of aircraft. The refueling cart includes a drivable chassis operable by a single technician and equipped with a fuel sump tank, a swivel plate with a multi-nozzle reel, and a hybrid operating system for monitoring fuel metrics and operational data. The system further includes a density reader and thermometer for real-time fuel flow and quality validation, interlock indicators for secure nozzle engagement, and solar-powered components such as wheels and lighting. The swivel plate allows for nozzle alignment with both over the-wing and low-wing aircraft fuel ports without repositioning the cart. The hybrid operating system integrates with fleet management platforms and supports solo technician operation while enhancing safety, efficiency, and environmental sustainability.

19 Claims, 4 Drawing Sheets

(56) References Cited

U.S. PATENT DOCUMENTS

| | | | | |
|---|---|---|---|---|
| 6,213,515 | B1 | 4/2001 | La Terra | |
| 6,701,980 | B2 | 3/2004 | Rothrock | |
| 7,415,990 | B2 | 8/2008 | von Meyerinck | |
| 8,666,586 | B2 | 3/2014 | Portocalis et al. | |
| 8,740,251 | B2 | 6/2014 | Batson et al. | |
| 8,763,956 | B2 | 7/2014 | Beck | |
| 9,041,548 | B2 | 5/2015 | Portocalis et al. | |
| 9,823,665 | B2 | 11/2017 | Finnell et al. | |
| 10,960,990 | B2 | 3/2021 | Gammon | |
| 11,328,619 | B1 * | 5/2022 | Suntup | B67D 7/04 |
| 12,030,667 | B2 | 7/2024 | Maedler et al. | |
| 2004/0108414 | A1 | 6/2004 | Determan et al. | |
| 2009/0315729 | A1 | 12/2009 | Inhoffer | |
| 2011/0048572 | A1 * | 3/2011 | Batson | B64F 1/28 141/1 |
| 2016/0362195 | A1 * | 12/2016 | Wilkinson | B67D 7/04 |
| 2018/0339787 | A1 | 11/2018 | Nekkalapudi et al. | |
| 2020/0126401 | A1 | 4/2020 | Clevenger | |
| 2023/0294644 | A1 | 9/2023 | Del Gizzi et al. | |

OTHER PUBLICATIONS

Wikimedia Commons, File: Aircraft-refueller-hydrant-cart.jpg. chrome-extension://efaidnbmnnnibpcajpcglclefindmkaj/https://drive.usercontent.google.com/download?id=1uqdDaNhipIQ3EBm8ZUnW9ufTjXijzrmb&authuser= 1&acrobatPromotionSource=gdrive_chrome-list [Date accessed: Aug. 20, 2024].

Hydrant Dispenser Cart, betafueling.com. https://betafueling.com/industries/commercial-aviation/hydrant-dispenser-cart/ [Date accessed: Jul. 31, 2024].

* cited by examiner

AIRCRAFT SYSTEM FOR A MOBILE REFUELING VEHICLE

CROSS-REFERENCE TO RELATED APPLICATIONS

This application is a non-provisional patent application that claims priority to a provisional patent application 63/717,158, which was filed on Nov. 6, 2024, which is incorporated by reference in their entirety.

FIELD OF THE DISCLOSURE

The present invention relates to mobile refueling cart with a drivable chassis, a swivel plate and a nozzle reel for operating with over the wing or low wing aircraft and refueling over or under wing, as well as interlock indicators and other elements to facilitate the safe and efficient refueling of an aircraft, including by a single technician.

BACKGROUND

Currently, there are three main types of refueling equipment commonly used for aircraft whether by private plane services at private airports, regional carriers, or commercial aircraft operators. These three types of equipment include carts, hydrant trucks, and tankers. Many issues exist with these types of equipment. For example, carts may each weigh over 300 pounds and are mobile by man power and additional ground service units (i.e. cannot be driven as a normal vehicle but must be pushed or towed via manpower). Carts require two trained employees to move each cart. Many serious injuries can occur to the employees as they try to move the cart manually in place to fuel an aircraft.

With respect to hydrant trucks and tankers, many issues persist as well. Hydrant trucks and tankers have multiple blind spots as they do not include specialized mirrors or other features that are convenient in a vehicle, and require a guide person near the aircraft for the hydrant truck to be driven near the aircraft. Each type of vehicle lacks safety features and other features to ensure aircraft fueling is performed correctly and efficiently in a manner that also ensures a correct amount of fuel is delivered to the aircraft. Accordingly, a mobile refueling cart is still needed that overcomes the deficiencies of the existing refueling vehicles.

SUMMARY

The present description is directed to a mobile aircraft refueling cart for servicing an aircraft, comprising a refueling cart body comprising a modified axle affixed to a chassis of a mini-truck or flatbed truck. The mobile aircraft refueling cart may further comprise one or more specialized mirrors mounted on the cart body and configured to enhance rear and side visibility during maneuvering near aircraft. The mobile and drivable refueling cart may further comprise a swivel plate mounted on the refueling cart body and configured to support and rotate a nozzle reel for dispensing fuel to an aircraft, wherein the swivel plate further comprises a nozzle reel, the nozzle reel configured to receive and store a plurality of nozzle types adaptable for both overwing and low wing aircraft refueling operations. The mobile refueling cart may further comprise at least one interlock indicator visually indicating secure engagement of a nozzle with an aircraft fuel tank, wherein the refueling cart is operable to refuel aircraft of varying fuel port locations without repositioning the cart. In a non-limiting embodiment, the interlock indicator is mounted externally adjacent to the nozzle reel. The swivel plate may have a rotation angle of at least 270 degrees to accommodate aircraft with varying wing positions. The chassis of the mobile refueling cart is a drivable vehicle chassis configured for operation by a single technician. The mobile refueling cart may further comprise a fuel sump tank mounted on the chassis. The mobile refueling cart may further comprise a hybrid operating system comprising software configured to monitor and report fuel levels, flow rate, and refueling data. The hybrid operating system may include plug-in modules compatible with existing airport fleet and fuel management systems. The mobile refueling cart may further comprise a density reader configured to measure the flow rate and weight of fuel dispensed as well as a thermometer operatively coupled to the density reader to validate fuel density parameters. The density reader may be calibrated to detect variances in fuel composition and trigger alerts through the operating system. The mobile refueling cart may further comprise one or more solar-powered components selected from: solar-powered lights, solar-powered wheels, or combinations thereof. The solar-powered wheels store kinetic and solar energy to extend the driving range of the refueling cart.

The mobile refueling cart may further comprise specialized mirrors configured to enable a 360-degree field of view to assist in solo technician parking. In a non-limiting embodiment, the mobile refueling cart further comprises an adjustable seat, onboard AC unit, rear-view camera, and dashboard storage compartment. Further, the mobile refueling cart may comprise an electric battery and is operable in electric, solar, or hybrid fuel-electric mode.

The present description may further include a non-limiting method for refueling an aircraft using a mobile refueling cart. The method may include driving the mobile refueling cart to an aircraft, wherein the mobile refueling cart has a chassis that is a drivable vehicle chassis configured for operation by a single technician. The chassis is the structural frame or skeleton of a vehicle that is hidden underneath the body and serves as the base for all other components like the engine, suspension, and wheels. It is not a single visible part, but the entire undercarriage that provides strength and stability to the refueling cart. The mobile refueling cart further includes a modified axle to accommodate the chassis of the refueling cart, whereby the axle is a shaft that rotates with wheels or has wheels on its ends, and it serves to transfer power and support a vehicle's weight. The axle connects the wheels to the engine and transmission, driving the vehicle (refueling cart) forward while also bearing the vehicle's weight and absorbing shocks.

The method may further include selecting a nozzle from a plurality of nozzle types stored on a nozzle reel mounted on a swivel plate. The method may include positioning the swivel plate to align the selected nozzle with a fuel port of the aircraft and locking the selected nozzle into the fuel port. The method may include activating an interlock indicator upon secure connection of the nozzle and dispensing fuel while monitoring flow rate and density calculation via a fuel meter, density reader and thermometer. The method may include preventing movement of the mobile refueling cart while the interlock indicator is active. The method may include preventing refueling until the interlock indicator confirms secure connection of the nozzle. The method may further include optionally powering components of the mobile refueling cart using solar energy.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

The present description is drawn to an innovative mobile aircraft refueling hydrant cart. The mobile aircraft refueling hydrant cart can advantageously be driven by a single individual and does not require multiple staff or crew members to assist in the refueling of the intended aircraft/airplane. Further, the aircraft refueling hydrant cart includes a number of additional safety and technical features that will greatly improve the refueling process. In one or more non-limiting embodiments, the mobile refueling hydrant cart as presented herein is designed to supply safe fueling equipment in compact aircraft spaces, as well as utilize car manufacture, aerial ground service equipment, and fuel cart facilities, as well as utilize eco-friendly solar car products. The refueling hydrant cart allows aircraft refueling technicians to independently park near aircraft to quickly and safely adjust equipment to add fuel on aircraft. Further details are provided in association with the Figures below.

Figure 1:
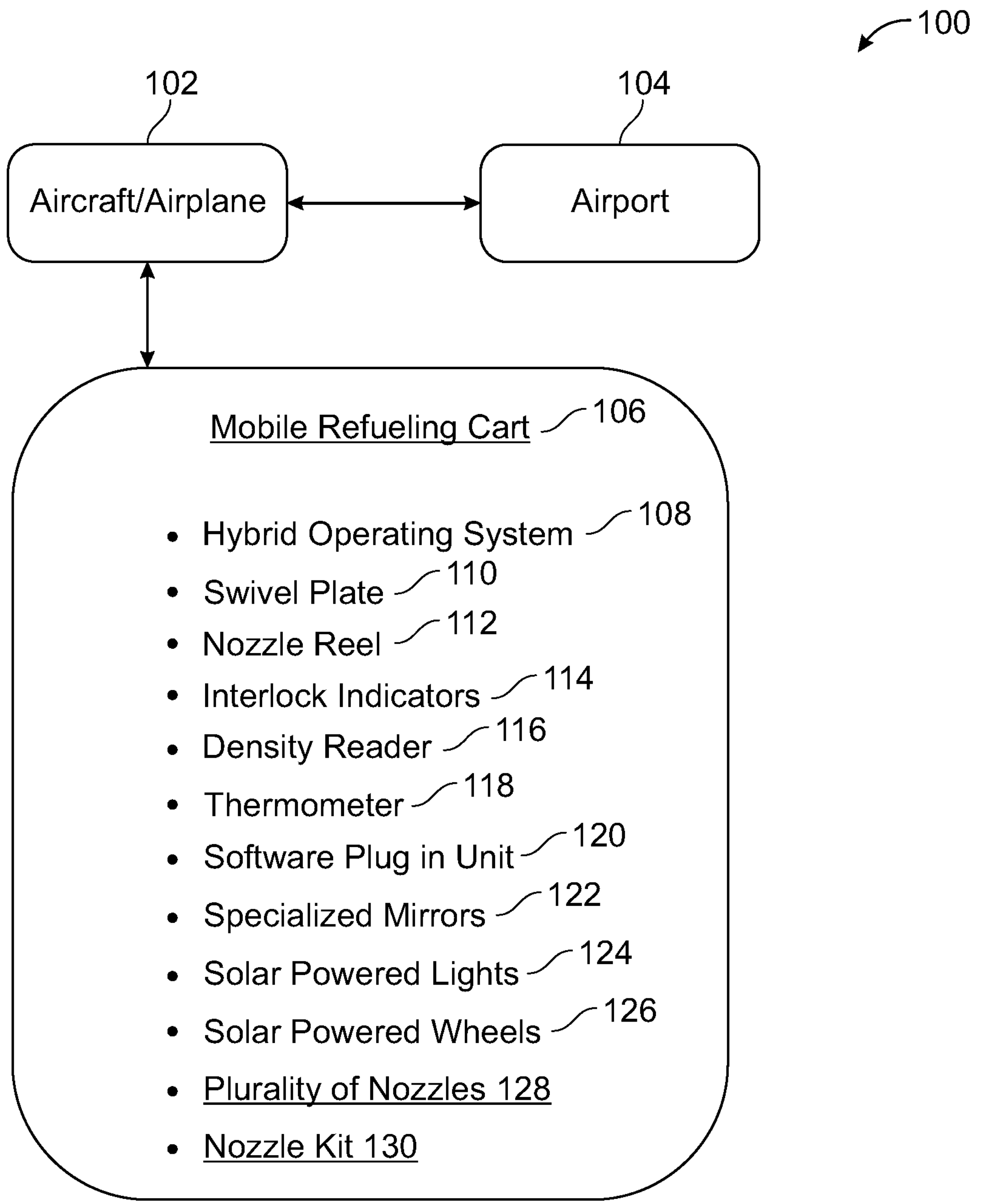
FIG. 1 depicts a block diagram of an exemplary mobile refueling hydrant cart.
Figures 3A, 3B, 3C:
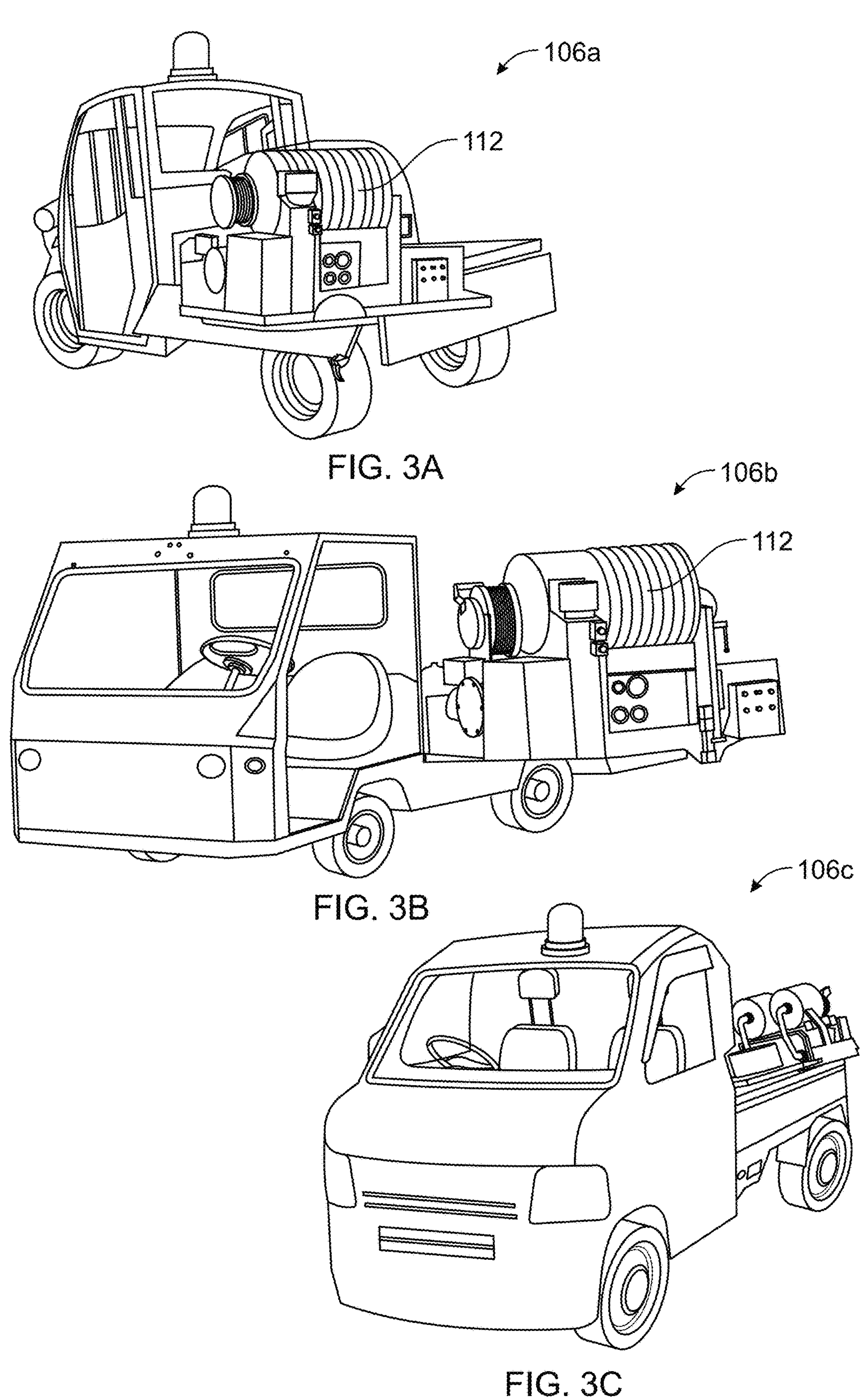
FIGS. 3A-3C depict a pictorial illustration with an exemplary set of features for one or more refueling hydrant carts.

FIG. 1 shows an exemplary block diagram with one or more components for the system 100 provided herein. In a non-limiting embodiment, the present description provides one or more novel refueling cart 106. The refueling cart 106 is a drivable vehicle that can be independently driven by a refueling technician and/or other user in order to provide fuel to an aircraft/airplane 102 at an airport 104 or other facility housing the aircraft/airplane 102. The size of the refueling cart 106 may be customized to allow a single technician to operate the refueling cart 106 and drive the refueling cart 106 to the airplane 102 without requiring assistance from additional operators to move or park the refueling cart 106 by the airplane 102. The refueling cart 106 has wheels and a driver's seat and a steering wheel (e.g. as shown in FIGS. 3A-3C).

There are many features that may make up the one or more non-limiting embodiments of a refueling cart 106. In a non-limiting embodiment, the refueling cart 106 includes a hybrid operating system 108 which is a software program and system that acts to support the health requirements and longevity of use by the aircraft fueling technicians. The hybrid operating system 108 may collect useful data regarding the amount of fuel provided to the airplane 102 from the refueling cart 106 as well as many other aspects of data useful for monitoring the fuel in the refueling cart 106. In conjunction with the hybrid operating system 108, the refueling cart 106 may further include a density reader 116 to determine fuel flow rate and weight for the balance and accounting of the aircraft 102. The density reader 116 may be a metered density reader whereby the meter element of the metered density reader 116 counts disbursed gallons of fuel for the airplane 102. The refueling cart 106 may further include a thermometer 118, which may be used to verify density range to operate in conjunction with the density reader 116. In addition to the above, the refueling cart 106 may utilize software plug in units 120 which operate in conjunction with the hybrid operating system 108 and also to enable compatibility with existing fleet and fuel accounting systems.

The refueling cart 106 may further include solar powered lights 124 and solar powered wheels 126. The solar powered lights 124 may be used to support the use and daytime running lights of the refueling cart 106 for safety recognition. The solar powered wheels 126 can be used to bypass the requirement for electric use and may be enabled to be recharged by sunlight.

In addition to the above, the refueling cart 106 may include a swivel plate 110 having a nozzle reel 112 which is adapted to receive various types of nozzles. Currently, most existing refueling vehicles are limited to a single type of nozzle fueling type to either service over the wing or low wing type aircraft which have slightly different fuel tank placement. Frequently, there have to be separate types of fuel vehicles and processes to accommodate fueling an airplane 102 depending if the airplane 102 has over the wings or low wings and the location of the fuel tanks. If the fuel tank on the airplane 102 is not in a position compatible with the specifications of a currently available fuel truck, the technician may have to reposition the entire fuel truck to best position the vehicle in such a way to be able to provide fuel to the aircraft 102 which can cause extensive delays in time and delay an aircraft 102's ability to stay on time with an existing schedule. Alternatively, the technician has to return to refuel at another time with a different model fuel truck or nozzle. The swivel plate 110 functions to move and rotate from side to side in order for any nozzles on the nozzle reel 112 to be useable and insertable into the fuel port of an airplane whether or not it has to be inserted over the wing 102 of an airplane 102 or under the wing depending on the type of airplane 102. In a non-limiting embodiment, the swivel plate 110 can rotate anywhere from 180 to 270 to 360 degrees as needed.

Figure 2:
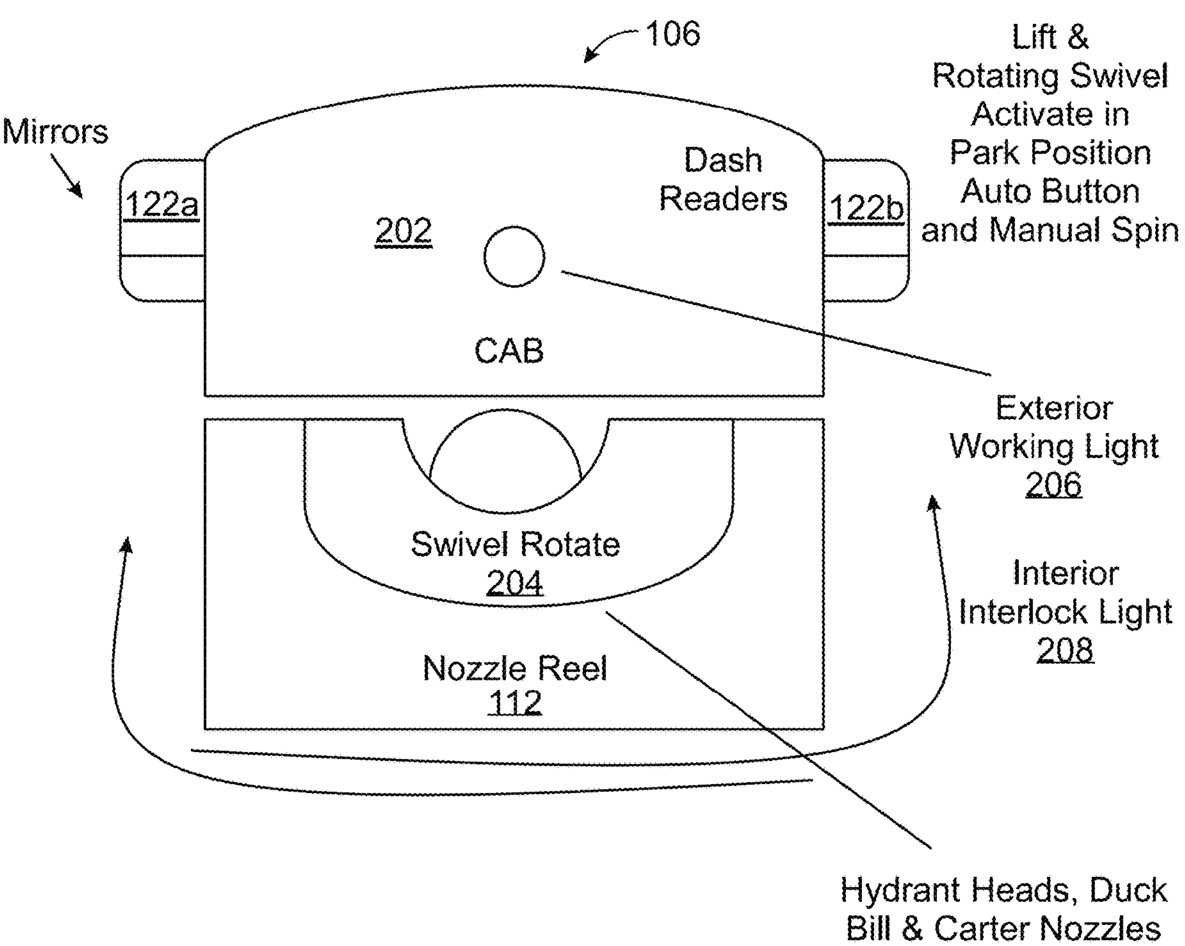
FIG. 2 depicts a pictorial illustration of elements of the mobile refueling hydrant cart.

FIG. 2 shows a pictorial illustration of an exemplary mobile fueling cart 106. The mobile fueling cart 106 may include a cab 202 for the single technician to sit in and to drive the mobile fueling cart 106 (which has a drivable vehicle chassis).

Advantageously, the refueling cart 106 includes a swivel plate 110 on the back portion of the cart 106 so that the technician can cause the fuel hoses connected to the swivel plate 110 on the refueling cart 106 to reach any part of the aircraft 102 as needed to provide fuel to the aircraft 102 and the attached nozzle reel 112 having a plurality of nozzles 128 to choose from to match the specific type of aircraft fuel port. Accordingly, the swivel plate 110 on the refueling cart 106 ensures that the fuel technician can supply fuel to an aircraft/airplane 102 whether this is done using overwing fueling or underwing fueling. Overwing fueling refers to a method of refueling small aircraft and piston-engine aircraft by manually pouring or pumping fuel through an access port on the top of the wing. This is in contrast to larger aircraft that typically require that fuel be pumped under pressure into a single or dual connection port, typically on the underside of the wing. The combination of the nozzle reel 112 that can accommodate various types of nozzle attachments with the swivel plate 110 ensures that even one technician manning the refueling cart 106 has the technical capability to use one refueling cart 106 to provide fuel to a fuel tank on the airplane 102 regardless of the position of the fuel tank on the airplane 102 and includes a nozzle reel 112 with sufficient length and the appropriate nozzle to directly funnel the fuel into the fuel tank of the airplane 102. This is because the swivel plate 110 can rotate or swivel from 0-360 degree direction so that the aircraft or airplane or the fuel cart 106 does not have to be moved to accommodate an over the wing or a low wing on an aircraft or airplane 102. Rather, the swivel plate 110 can be manipulated to extend to the left or right to accommodate where the fuel connection point on the parked aircraft 102 may be. The swivel plate 110 and nozzle reel 112 and interlock indicators 114 are coupled together and placed on a back frame behind the cab (e.g. cab 202) of the fueling cart 106.

Additionally, it is desirable that refueling cart 106 includes interlock indicators 114 which function to visually and visibly indicate to the technicians that a nozzle attached to the nozzle reel 112 that provides fuel to the airplane 102 and is inserted into the fuel tank is locked in place at the time fuel is intended to be pumped into the fuel tank. The interlock indicators 114 may ensure safe transfer of fuel with visible corroboration for the correct positioning and connection of the nozzle into the fuel tank. Such indicators may be placed on the interior of the refueling cart 106 near the driver or passenger side of a dashboard inside the refueling cart 106 or may be visibly from an outside location on the refueling cart 106 and/or may be located near to the nozzle on the nozzle reel 112 in one or more non-limiting embodiments. In a non-limiting embodiment, until the interlock indicators 114 are no longer active, the refueling cart 106 may not be able to be moved or driven or at least while fuel pumping is occurring. FIG. 2 shows in an illustrative manner that one or more exterior working lights 206 may be attached to a top of the cab 202 of a mobile cart 106 and one or more interior (or exterior) interlock lights 208 may be attached near the swivel plate 110 and the nozzle reel 112.

The refueling cart 106 may further include specialized mirrors 122 to enable the technician on the refueling cart 106 to see from all angles and to enable the technician to solo park the refueling cart 106 near the airplane 102 in a required location which is not currently an option for refueling vehicles as more than one employee or staff member has to physically guide existing vehicles into place to ensure that the existing vehicles do not hit the airplane 102 while backing up with blind spots due to nozzle real 112 positions.

FIGS. 3A-3C illustrate three various exemplary types of mobile refueling carts 106 with varying sizes and dimensions and technical features. In a non-limiting embodiment, as shown in a non-limiting example in FIG. 3A, mobile refueling cart 106*a* may include various original model features such as a 48 volt electric battery with a range of approximately 40-50 miles. If solar wheels, such as solar wheels 126 are included, an additional 15 miles may be obtained. As such, the refueling cart 106*a* is itself designed to be more environmentally friendly and can reduce the impact of emissions with zero carbon emissions.

Additionally, the refueling cart 106*a* may have a load capacity of approximately 2000 pounds (which is modifiable to further sizing) and a two capacity of 5000 pounds. The refueling cart 106*a* may include a 115 inch turning radius. The refueling cart 106*a* may advantageously be able to have a two person capacity.

The refueling cart 106*a* may include unitized 12 gauge smooth skin steel. Further, the refueling cart 106*a* may include much needed safety features such as specialized mirrors 122 (including but not limited to rear view mirrors), seat belts, tail lights, brake lights, turn signals, a horn, in seat storage, window wipers, a roof mounted beacon, a fire extinguisher, and a Hobbs hour meter. Further, the refueling cart 106*a* includes interlock indicators 114 and software fleet connector plug in unis 120 as described above. Further, refueling cart 106*a* may include an FMS,QT, Fleet Connect plug ins and a rear window.

As shown in a non-limiting example in FIG. 3*b*, the refueling cart 106*b* may include all of the same features as described and shown with respect to refueling cart 106*a*. Further, the additional technical features for refueling cart 106*b* may include being able to drive to speeds such as 25 miles per hour as well as the refueling cart 106*b* may include AC, a premium instrument cluster, sun visors, interior lights, a 12V outlet, a rear hinged glass with a sliding window. The refueling cart 106*b* may further include turf tires, adjustable seats, a back up camera system with warning safety triangles and/or symbols, power steering, and solar lights 124. The refueling cart 106*b* may further be operated as an electric and solar hybrid vehicle. Additionally, the refueling cart 106*b* may include a lockable in seat storage, dash storage compartment, a reverse buzzer, and soft bumpers.

As shown in a non-limiting example in FIG. 3C, the refueling cart 106*c* may include all of the same features as described and as shown in FIG. 3A, further including, operating as a fuel and solar hybrid vehicle. The refueling cart 106*c* may be driven to speeds such as 65 miles per hour. The refueling cart 106*c* may be operated as a 2 wheel drive or a 4 wheel drive with automatic transmission. Further, the exemplary refueling cart 106*c* may include a density reader 116, a thermometer 118, and a nozzle kit 130 which can be attached as needed to a nozzle reel 112 and a swivel plate 110. In a non-limiting embodiment, the refueling carts 106*a*, 106*b*, and 106*c* may each include a swivel plate 110 and a nozzle reel 112 with varying types of nozzle and nozzle attachments (e.g. a plurality of nozzles 128). These plurality of nozzles 128 may include a duck bill type of nozzle and carter nozzles and universal hydrant heads.

In a non-limiting embodiment, the mobile refueling hydrant cart may include underwing nozzles, rails, and a hydrant head with a pit coupler, as well as two quick access shut offs located at right front and left front module corners. Further, the refueling cart 106 may be flow tested for proper operation of all controls and valves. The refueling cart 106 may include non-paint, stainless steel piping, an aluminum filter monitor, and galvanized VIC connections. Further, the refueling cart 106 may contain forklift tracks, quick disconnects, gate valves, and snap-type coupler air lines and electrical connections.

Figure 4:
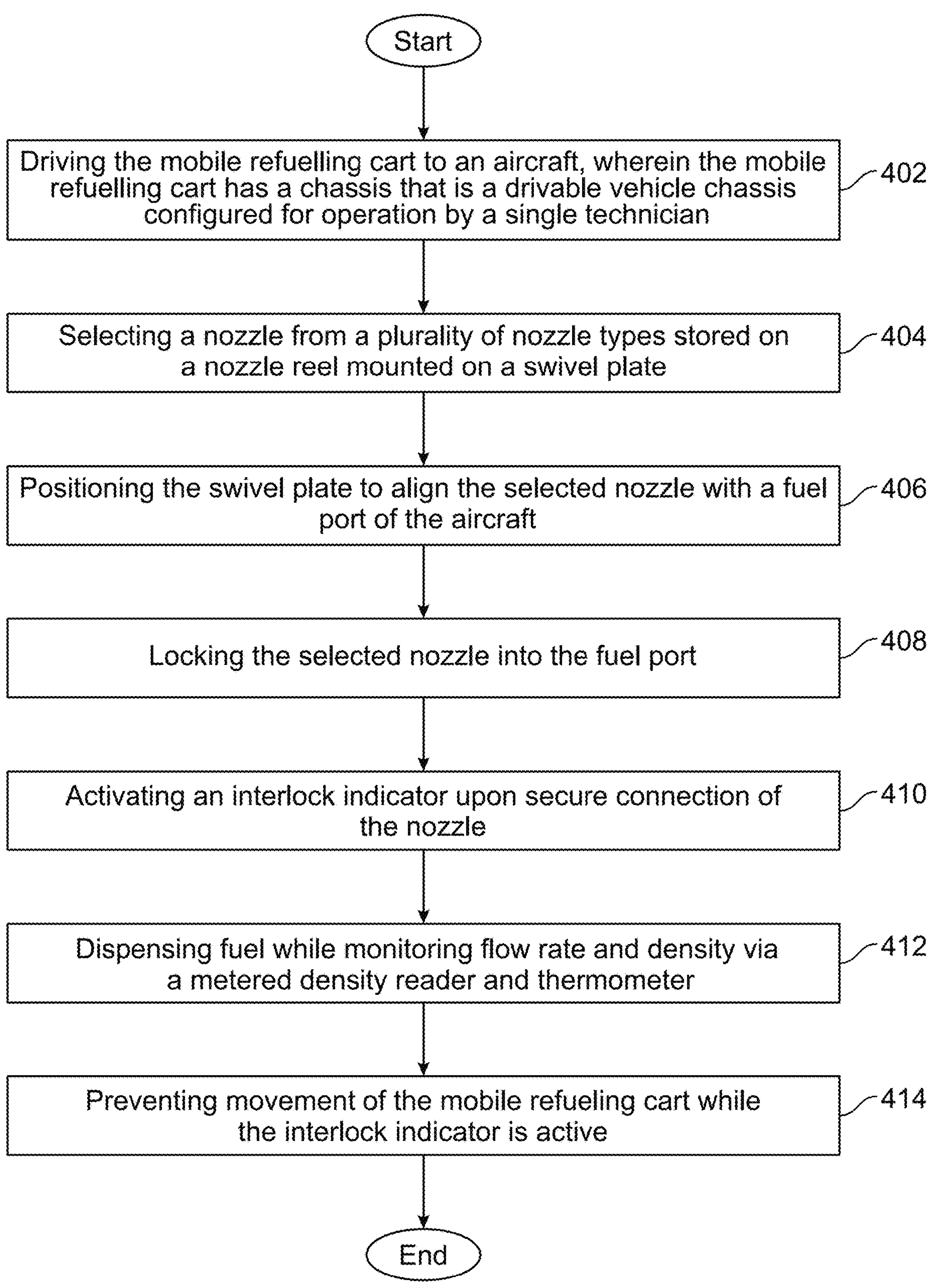
FIG. 4 depicts a flow chart for an exemplary method of using a mobile hydrant cart.

FIG. 4 depicts a flowchart for an exemplary method of using one or more mobile refueling hydrant carts 106 having one or more features as noted above. At step 402, the method may include driving the mobile refueling cart 106 (e.g. 106*a*-106*c* as shown in FIGS. 3A-3C) to an aircraft 102. One of the salient features of the mobile refueling cart 106 is that the cart 106 has a chassis that is a drivable vehicle chassis and it is configured for operation and driving like a car or truck by a single technician who may sit in a cab 102 or front area 202 of the cart 106 and use a steering wheel to drive the mobile refueling cart 106 to the airplane/aircraft 102. The technician can advantageously drive the cart 106 rather than having to manually push a cart as is the case with most hydrant carts which are not drivable and which put a tremendous strain on the technician who is manually pushing the existing hydrant cart. Further, a single technician can operate and drive the mobile refueling cart 106 rather than requiring multiple technicians to steer or operate the mobile refueling cart 106 thus saving on labor and manpower.

Step 404 of the flowchart shown in FIG. 4 describes selecting a nozzle from a plurality of nozzle types that are stored on or beside a nozzle reel 112 mounted on a swivel plate 110. At step 406, the method may include positioning the swivel plate 110 to align the selected nozzle with a fuel port of the aircraft 102. At step 408, the method may include locking the selected nozzle into the fuel port of the aircraft 102. At step 410, the method may include activating an interlock indicator upon secure connection of the nozzle. At step 412, the method may include dispensing fuel while monitoring the flow rate and the gallons of the fuel that is being dispensed using a fuel meter, and a metered density reader 116, and thermometer 118. At step 414, the method may include preventing movement of the mobile refueling cart while the interlock indicator is active.

The refueling carts 106 as described herein may include multiple benefits and advantages over existing refueling vehicles. For example, the refueling carts 106 may help to save time and money with the use of the hybrid equipment. The size and features of the refueling carts 106 may provide better visibility to the technician and operator of the refueling cart 106 and allow one person to handle the refueling cart 106. The refueling cart 106 may provide a better alternative to existing refueling vehicles and is a better alternative to aircraft safety, flight zones, employee health and safety due to the size, mobility, and hydrant ability of the refueling cart 106 to quickly service aircraft 102. The refueling cart 106 may be a compact hybrid mobile hydrant cart in one or more non-limiting embodiments that is durable with rear visibility and may be operated using one person.

The refueling carts 106 may further be an eco-friendly aircraft refueling vehicle that can service multiple carriers and airports. The refueling carts 106, as described in one or more non-limiting embodiment herein, may help to avoid aircraft damage. In a non-limiting embodiment, the refueling cart 106 may be designed for aircraft 102 carrying fuel loads 25,000 pounds or less such as the following aircraft such as, but not limited to, EMB 120 Brasilia, CRJ 200, CRJ 700/900, EMB 190, DC9, MD88, and MD90.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term “comprises” and grammatical equivalents thereof are used herein to mean that other components, ingredients, and steps, among others, are optionally present. For example, an article “comprising” (or “which comprises”) components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility)

The term “at least” followed by a number is used herein to denote the start of a range beginning with that number (which may be a range having an upper limit or no upper limit, depending on the variable being defined). For example, “at least 1” means 1 or more than 1. The term “at most” followed by a number is used herein to denote the end of a range ending with that number (which may be a range having 1 or 0 as its lower limit, or a range having no lower limit, depending upon the variable being defined). For example, “at most 4” means 4 or less than 4, and “at most 40%” means 40% or less than 40%. When, in this specification, a range is given as “(a first number) to (a second number)” or “(a first number)-(a second number),” this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as “upward,” “downward,” “left,” and “right” would refer to directions in the drawings to which reference is made unless otherwise stated. Similarly, words such as “inward” and “outward” would refer to directions toward and away from, respectively, the geometric center of a device or area and designated parts thereof. References in the singular tense include the plural, and vice versa, unless otherwise noted. The term “coupled to” as used herein may refer to a direct or indirect connection.

Specific details are given in the description to provide a thorough understanding of the embodiments. However, embodiments may be practiced without these specific details. This description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figure.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. An apparatus comprising:

a mobile aircraft refueling cart for servicing an aircraft, the mobile aircraft refueling cart comprising:

a mobile refueling cart body comprising a modified axle affixed to a chassis of a mini-truck or flatbed truck, wherein the chassis is a drivable vehicle chassis configured for operation by a single technician, wherein the single technician can steer or operate a steering wheel on the mobile refueling cart to the aircraft, wherein the single technician does not have to manually push the mobile refueling cart;

one or more specialized mirrors mounted on the refueling cart body and configured to enhance rear and side visibility during maneuvering near aircraft;

a nozzle kit having a plurality of nozzles;

a swivel plate mounted on the refueling cart body and configured to support and rotate a nozzle reel for dispensing fuel to an aircraft, wherein the nozzle reel is configured to receive one or more nozzles from the plurality of nozzles stored on the nozzle kit, wherein the plurality of nozzles are adaptable for both overwing and underwing aircraft refueling operations; and at least one interlock indicator visually indicating secure engagement of a nozzle from the nozzle kit with an aircraft fuel tank;

wherein the mobile aircraft refueling cart is operable to refuel the aircraft of varying fuel port locations without repositioning the mobile aircraft refueling cart.

2. The apparatus of claim 1, wherein the interlock indicator is mounted externally adjacent to the nozzle reel.

3. The apparatus of claim 1, wherein the swivel plate has a rotation angle of at least 270 degrees to accommodate aircraft with varying wing positions.

4. The apparatus of claim 1, further comprising, a fuel sump tank mounted on the chassis.

5. The apparatus of claim 1, further comprising specialized mirrors configured to enable a 360-degree field of view to assist in solo technician parking.

6. The apparatus of claim 1, further comprising an adjustable seat, onboard AC unit, rear-view camera, and dashboard storage compartment.

7. The apparatus of claim 1, wherein the mobile aircraft refueling cart includes an electric battery and is operable in electric, solar, or hybrid fuel-electric mode.

8. The apparatus of claim 1, further comprising, a hybrid operating system comprising software configured to monitor and report fuel levels, flow rate, and refueling data.

9. The apparatus of claim 6, wherein the hybrid operating system includes plug-in modules compatible with existing airport fleet management systems.

10. The apparatus of claim 1, further comprising one or more solar-powered components selected from: solar-powered lights, solar-powered wheels, or combinations thereof.

11. The apparatus of claim 10, wherein the solar-powered wheels store kinetic and solar energy to extend the driving range of the mobile aircraft refueling cart.

12. The apparatus of claim 1, further comprising, a density reader configured to measure the flow rate and density of fuel dispensed.

13. The apparatus of claim 8, further comprising, a thermometer operatively coupled to the density reader to validate fuel density parameters.

14. The apparatus of claim 8, wherein the density reader is calibrated to detect variances in fuel composition and trigger alerts through an operating system of the mobile aircraft refueling cart.

15. A method of refueling an aircraft using a mobile refueling cart, comprising:

driving the mobile refueling cart to an aircraft, wherein the mobile refueling cart has a chassis that is a drivable vehicle chassis configured for operation by a single technician, wherein the single technician can steer or operate a steering wheel on the mobile refueling cart to an aircraft, wherein the single technician does not have to manually push the mobile refueling cart;

selecting a nozzle from a plurality of nozzle types stored as part of a nozzle kit and configured to be attached to a nozzle reel mounted on a swivel plate;

positioning the swivel plate to align the selected nozzle with a fuel port of the aircraft;

locking the selected nozzle into the fuel port;

activating an interlock indicator upon secure connection of the nozzle;

dispensing fuel while monitoring flow rate and density via a density reader and thermometer; and preventing movement of the mobile refueling cart while the interlock indicator is active.

16. The method of claim 15, further comprising, preventing refueling until the interlock indicator confirms secure connection of the selected nozzle.

17. The method of claim 15, further comprising, optionally powering components of the mobile refueling cart using solar energy.

18. The method of claim 15, further comprising, powering on solar powered lights and solar powered wheels.

19. The method of claim 15, further comprising, providing rear visibility to the single technician while operating the mobile refueling cart.

* * * * *